(12) United States Patent
Kihara et al.

(10) Patent No.: US 7,111,043 B2
(45) Date of Patent: Sep. 19, 2006

(54) COMMUNICATION ASSISTANCE METHOD AND DEVICE

(75) Inventors: Hideto Kihara, Kawasaki (JP); Masahiko Murakami, Kawasaki (JP); Sumiyo Okada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 608 days.

(21) Appl. No.: 09/883,996

(22) Filed: Jun. 20, 2001

(65) Prior Publication Data
US 2002/0010742 A1    Jan. 24, 2002

Related U.S. Application Data

(63) Continuation of application No. PCT/JP99/00008, filed on Jan. 4, 1999.

(51) Int. Cl.
G06F 15/16 (2006.01)

(52) U.S. Cl. .................. 709/204; 709/227; 715/733; 715/753; 715/761; 719/315

(58) Field of Classification Search ............. 709/227, 709/228, 229, 204; 719/315; 715/733, 753, 715/761
See application file for complete search history.

(56) References Cited

U.S. PATENT DOCUMENTS

| | | | | |
|---|---|---|---|---|
| 5,414,812 A * | 5/1995 | Filip et al. | | 707/103 R |
| 5,764,916 A | 6/1998 | Busey et al. | | |
| 5,828,839 A * | 10/1998 | Moncreiff | | 709/204 |
| 5,864,670 A * | 1/1999 | Hayashi et al. | | 709/204 |
| 5,867,665 A * | 2/1999 | Butman et al. | | 709/239 |
| 6,154,782 A * | 11/2000 | Kawaguchi et al. | | 709/239 |
| 6,185,625 B1 * | 2/2001 | Tso et al. | | 709/247 |
| 6,226,678 B1 * | 5/2001 | Mattaway et al. | | 709/230 |
| 6,343,333 B1 * | 1/2002 | Matsumoto et al. | | 719/320 |
| 6,417,819 B1 * | 7/2002 | Matsumoto et al. | | 345/1.1 |
| 6,446,112 B1 * | 9/2002 | Bunney et al. | | 709/204 |
| 6,502,126 B1 * | 12/2002 | Pendakur | | 709/204 |
| 6,643,697 B1 * | 11/2003 | Eves et al. | | 709/225 |
| 6,778,661 B1 * | 8/2004 | Yumoto et al. | | 379/265.09 |

(Continued)

FOREIGN PATENT DOCUMENTS

JP    3-98157    4/1991

(Continued)

OTHER PUBLICATIONS

Reiko Murakami, "Internet No Application CHOCOA", Internetworking, vol. 3, No. 1 Jan. 1997 (Tokyo), p. 102-110.

(Continued)

Primary Examiner—Saleh Najjar
Assistant Examiner—Michael Y. Won
(74) Attorney, Agent, or Firm—Staas & Halsey LLP

(57) ABSTRACT

To be used with a chat client. A condition DB 3 associates prescribed conditions relating to a message to any channel with processing for such message, and stores this information. An acquisition unit 7, in accordance with a condition and processing, acquires information relating to a channel from a chat client. A determination unit 4, prior to the sending of a message into a channel, determines whether a message meets a condition based on the acquired channel information. An execution unit 5 carries out processing on a message based on determination results and condition, and sends the processed message into a channel via a chat client. An example of a condition is, that message is at least 30 lines or more. An example of processing is, confirming message with a user.

19 Claims, 12 Drawing Sheets

U.S. PATENT DOCUMENTS 6,993,564 B1 * 1/2006 Whitten, II ................. 709/207
7,013,326 B1 * 3/2006 Suzuki et al. ............... 709/204

FOREIGN PATENT DOCUMENTS

| JP | 4-213258 | 8/1992 |
| JP | 04-365127 | 12/1992 |
| JP | 5-110590 | 4/1993 |
| JP | 5-236131 | 9/1993 |
| JP | 6-195278 | 7/1994 |
| JP | 9-81485 | 3/1997 |
| JP | 10-83362 | 3/1998 |
| JP | 10-154117 | 6/1998 |

OTHER PUBLICATIONS

Reiko Murakami, "Internet No Application CHOCOA o motto tsukaikonasou", Internetworking, vol. 3, No. 2, Feb. 1997 (Tokyo), p. 96-102.

* cited by examiner

|  | Attributes | |
|---|---|---|
| Server Characteristics | Host Name | www.fujitsu.co.jp |
| Channel Characteristics | Channel Name | #CH1 |
|  | Topic | Patents |
|  | Time of Latest Message | 5:10 |
|  | Nickname | User A<br>User B<br>User C<br>User D |
|  | Real Names | Shiro Fujitsu<br>Taro Fujitsu<br>Jiro Fujitsu<br>Saburo Fujitu |
|  | Channel Name | #CH 2 |
|  | Topic | Fujitsu |

Fig. 2

| Classification | Nickname | Real Name |
|---|---|---|
| Known Persons | user B | Taro Fujitsu |
|  | user C | Jiro Fujitsu |
| Persons to Ignore | user E | Saburo Fujitsu |
| Superiors | user D | Hanako Fujitsu |
| ⋮ | ⋮ | ⋮ |

Fig. 3

| Channel Name | Attribute |
|---|---|
| #CH1 | read / write |
| #CH2 | read only |
| #CH3 | read only |

Fig. 4

| Condition ID | Condition | Processing |
|---|---|---|
| 1 | (Unknown People) ≧ 5 | Confirmation |
| 2 | (Number of Superiors) ≧ 1 | Confirmation |
| 3 | Read Only Channel | Confirmation, Change |
| 4 | (Elapsed Time) ≧ 15 minutes | Confirmation |
| 5 | (Japanese Messages) < 50% | Add Translation |
| 6 | Includes Likely Keyword | Keyword Conversion |
| 7 | (Inputted Lines) ≧ 30 | Create Web Page, Convert |
| 8 | (Connection with External Server) & (Message Containing Internal URL) | Confirmation |
| 9 | (Degree of Relevance) ≦ 0.1 | Confirmation |
| 10 | Includes Selected Portion | Display Relevant Portion |

Fig. 5

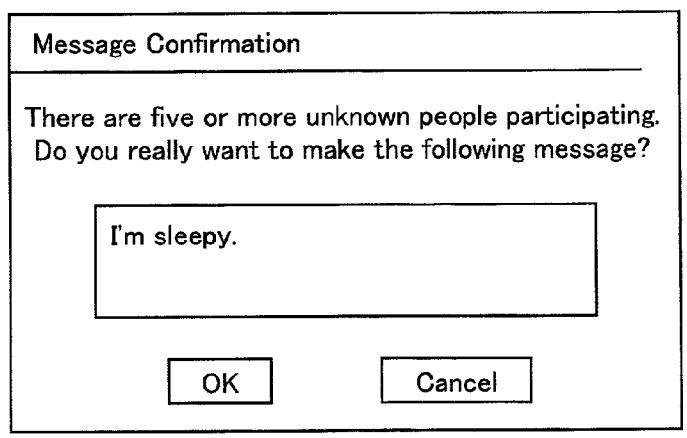

Fig. 6

| Channel Name | Likely Keyword |
|---|---|
| CH1 | user-B, user-C, user-D, Taro Fujitsu, Jiro Fujitsu, Saburo Fujitsu |
| CH2 | user-B, user-D, Taro Fujitsu, Saburo Fujitsu |
| ⋮ | ⋮ |

< #CH1 : user C > Please tell us about related patents

< #CH1 : user B > ○○○○

Refer to patent no. × × × ×

⇩

< #CH1 : user C > Please tell us about related patents.

< #CH1 : user B > ○○○○

< #CH1 : user A > Refer to patent no. × × × × >patents

Fig. 10

COMMUNICATION ASSISTANCE METHOD AND DEVICE

This is a continuation of International Application PCT/JP99/00008, with an international filing date of Jan. 4, 1999.

BACKGROUND OF THE INVENTION

1. Technical Field

The present invention relates to technology for encouraging conversation among users in a system wherein a plurality of users sharing the same network are able to conduct conversation simultaneously among themselves.

In the present invention, a chat system shall refer to a system comprising a chat server and a plurality of chat clients, such that a plurality of chat clients sharing the same space are able to conduct conversations simultaneously among themselves.

A channel shall refer to a virtual space shared by chat clients in the above chat system.

A channel mode shall refer to an attribute characterizing a channel used in Internet Relay Chat (IRC).

2. Description of Related Art

With the rapid growth of the Internet in recent years, it has become common for users to work together while using separate information terminals. For example, a plurality of users can use a chat system to carry out a conversation within a channel, thereby holding a conference in a channel, i.e., an electronic conference room.

In a chat system, just by inputting what he or she wants to state and then pressing the return key, a user can send a message into the channel in which he or she is participating. Because a user can chat with other users just as if they were having an ordinary conversation, he or she can send messages easily. Furthermore, in a chat system, a message sent by a user will be immediately displayed at the information terminals of other users. Therefore, not just one-to-one dialogues, but conversations involving three or more people are possible, as well as situations where one person is addressing a group of questioners and respondents. Because the conversation is carried out using the transmission of text data, the task of recording the conversation, as in minutes of the meeting, becomes simple. In such a chat system, sometimes a user participates simultaneously in a plurality of channels. Usually, when a user is participating in a plurality of channels, he or she focuses on one of them, and is able to send messages into that channel. This channel is called "current channel" and others are called "sub channel". With regard to sub channels, the messages from other users are displayed on screen, informing the user of what is being chatted on those sub channels. Changing current channels into which the user can send messages is easy. If a user wants to send a message into a different channel, he or she can switch to current channel at any time.

In the above situation, a user who is looking at a conversation in the other sub channel may forget to change the current channel, and end up sending a message intended for one of sub channels into the current channel. As was mentioned above, message inputted by the user will be sent to all users in the channel, in just the manner inputted, when the user presses the return key. This can result in the user sending message that does not match the conversation in the channel. Even if it happens that the content of the message wasn't inappropriate, there's the possibility that the manner of expression was inappropriate, as would be the case when one's superiors or people one doesn't know are participating in the channel, and one sends a message written in a manner of expression used among close friends.

Current chat systems have several other problems in addition to the above, examples of which are given below.

When conversations regarding different topics are taking place within one channel, it is difficult to tell to which message among messages previously sent a message is in response.

When a message is sent after a long interval since the previous one, and the message is sent in the same manner as if it were an immediate reply, this can be confusing to other users.

In a conversation between users who use different languages, a burden is placed on one of the users who has to switch to the language used by the other party, and this is an obstacle to lively conversation.

Certain chat clients can accept the registration of keywords specified by the user. When another user has sent a message that includes a registered keyword, the chat client in some way notifies the user that the keyword has been included in a message. Examples of notification include a chat window that had been closed opening and outputting a message. However, it is often the case that the user sending the message has no desire to provide a stimulus to other users.

SUMMARY OF THE INVENTION

It is an object of the present invention to help make more accurate a message sent from a user having a conversation with other users in real time using a chat system, thereby promoting smooth communication over a network.

In order to solve the above problems, a first aspect of the present invention provides a communication assistance method used in a communication device capable of simultaneously carrying out two-way communication among a plurality of users sharing the same network. The method includes the steps of:

A: correlating conditions relating to transmission object to be sent to any network with processings for the transmission object;

B: acquiring from the communication device information relating to the network in accordance with the conditions and the processings;

C: prior to transmission of the transmission object to be sent to the network, determining based on the acquired network information whether the transmission object meets at least one of the conditions;

D: conducting at least one of the processings on the transmission object based on the determination results, and sending the processed transmission object to be sent via the communication device to the network.

An explanation of this will be given using as an example a chat system wherein a plurality of users use a chat client as a communication device and chat over a chat server. The conditions to be prepared may be set as desired. Examples that can be given of conditions that can be set include, "The inputted message exceeds 30 lines" or "Attempted to send the URL (Uniform Resource Locator) of the company internal network to a server outside the company."

To give an example of the processings for the former example, a web page could be created on which the messages are posted, and the URL for that page is sent as the message into a chat client. The URL sent to a chat client is transmitted to the channel in the usual chat manner. To give an example of the processings for the latter example of the condition, the user would be asked to confirm whether the inputted message should be sent as is, and his or her reply would determine whether or not the message is sent. The message sent into a chat client is transmitted into the channel in the usual chat manner.

For the former of the above two conditions, network information acquired in accordance with the conditions and processings would be a message and name of channel where the message is sent. For the latter, network information acquired in accordance with conditions and processings would be, for example, the domain names of the chat server and the user terminal, as well as the message. Before an inputted message is sent into the server, determination is made based on this information whether any of the conditions is met, and then the above-described processing is performed. If none of the conditions is met, the inputted message is sent as is into the chat client.

A second aspect of the present invention provides a communication assistance method used in a communication device capable of simultaneously carrying out two-way communication among a plurality of users sharing the same network, including first storage means, acquisition means, determination means, and execution means.

First storage means correlates conditions relating to any transmission object to be sent to a network with processings for the transmission object, and then stores this correlated information.

Acquisition means acquires network information from the communication device in accordance with the conditions and the processings.

Determination means, based on the acquired network information, determines whether at least one of the conditions is met with regard to the transmission object before sending the transmission object to the network.

Execution means carries out at least one of the processings on the transmission object based on the determination results, and sends the processed transmission object to the network by means of the communication device.

As before, a plurality of users chatting using a chat system will be used as an example to assist explanation. Conditions for storage in the first storage means and the processings correlating to each condition can be set as desired. The acquisition means acquires from a chat client required information, in accordance with the conditions and processings stored in the first storage means. The minimum required network information is the channel name to which the message was sent, but generally network information acquired in accordance with set conditions and processings will vary greatly.

The determination means, based on acquired network information, determines whether the inputted message satisfies at least one of the conditions. The execution means carries out at least one of the processings on messages in accordance with determination results. For example, let us suppose that the determination means has determined that the condition "message is at least 30 lines" is met. In such a case, the execution means creates a web page on which is posted the message and sends the URL thereof to chat clients. If the message is less than 30 lines, the execution means sends the message acquired from a chat client as-is to the chat client.

A third aspect of the present invention presents a communication assistance device further comprising second storage means storing user-dependent user information in accordance with the conditions and the processings, and registration means accepting input of the user information from a user, and storing the same in the second storage means.

As an example let us consider the case where it is determined that the condition "five or more unknown people" is met. For this, a user must use registration means to register beforehand a list of "known people" with the second storage means.

When determination is made of whether this condition is met, the acquisition means acquires as network information a list of users participating in the channel from the chat client. The determination means computes the number of "unknown people" based on the list of "known people" registered in the second storage means and the list of "people participating in the channel."

A fourth aspect of the present invention provides a communication assistance device further comprising second storage means storing user-dependent user information in accordance with the conditions and the processings, and registration means setting the user information based on the network information, and storing the same in the second storage means.

For example, "read only," showing that a channel is for viewing only, and "read/write," showing that a message can be sent into a channel, can be set beforehand as channel attributes. Let us consider a case where determination is made regarding the condition of "message was sent into a read only channel." In such a case attributes of participating channels must be correlated with the participating channel and registered beforehand in the second storage means as network information.

The following is one conceivable method for registering a channel attribute. The acquisition means acquires as network information from a chat client the channel where a user can send a message, channels in which a user is a participant, and a channel that a user is currently focusing on. The registration means sets the attribute of the channel being focused on to "tread/write" and the attributes of the other channels to "read only." The determination means, based on the attribute of channel where a user can send a message, determines whether the condition applies. Of course the system may be so constituted that the registration means accepts instructions from a user for setting and changing channel attributes.

A fifth aspect of the present invention provides a communication assistance device wherein network information that the acquisition means acquires from the communication device includes at least information specifying the network to which the transmission object is to be sent and transmission content.

In the above-described example of a chat system, at least the destination channel name and message are acquired as network information. Let us consider as an example a case where the condition "The inputted message is at least 30 lines" has been set. The determination means can determine whether or not a message meets this condition based on the acquired message. The execution means notifies the chat client of the channel from which the message was sent, and sends to the chat client the message converted into an URL or as-is.

A sixth aspect of the present invention provides a communication assistance device wherein network information that the acquisition means acquires from the communication device includes at least information specifying the network to which the transmission object is to be sent and transmission content. In this communication assistance device, when the transmission object meets a condition, the execution means notifies the user of the relevant condition and message, and depending on the response from the user to the notice, either sends the message into the network or cancels such sending.

When a transmission object meets a condition, the execution means notifies the user of the relevant condition by, for example, displaying a confirmation window. If the user clicks on the "OK" button in the confirmation window, the execution means transmits the message into the chat server. However, if the user clicks on the "cancel" button in the confirmation window, the execution means cancels the transmission of the message into the chat server.

A seventh aspect of the present invention provides a communication assistance device further including second storage means storing users classified into classifications. In this communication assistance device, the first storage means stores as a condition, that in a network to which the transmission object is to be sent, the number of users belonging to a classification is within a range. The determination means determines, based on users classified in the second storage means, whether or not the transmission object meets the condition.

Examples of classifications are "unknown people," "superiors," "people to ignore." An example of a stored condition is "five or more unknown people are present." To be able to determine whether a condition is met or not, a user must have registered beforehand, for example, "known people" in the above-described second storage means.

If a condition is met, the execution means displays a confirmation message, such as "five or more unknown people are present," and confirms with the user whether to send the message as-is. The execution means may display the message along with the confirmation message, and accept changes to the message. The execution means, depending on the user response to this notice, transmits the message into the chat client or cancels such transmission.

Classifications can be set on a chat system, such as "channel operator," and the acquisition means can acquire user classifications from the chat client.

An eighth aspect of the present invention provides a communication assistance device further comprising second storage means storing attributes of a network with which the communication device is communicating. In this communication assistance device, the first storage means stores, as a condition, that the network to which the transmission object is to be sent has an attribute. The determination means determines whether the condition is met based on attributes, stored in the second storage means, of the network to which the message is to be sent.

An example of a stored condition is "The channel is the above-mentioned read only channel." To be able to determine whether a channel is read only or not, channel attributes must be registered in the second storage means.

When a stored condition is met, the execution means notifies the user of the met condition. For example, the execution means outputs to the user screen a confirmation message such as "This is a read only channel." The execution means, depending on the response of the user to the notice, either transmits the message into the chat client or cancels such transmission.

Attribute settings can be made on a chat system, as in channel modes such as "Invitation only" and "Private channel." In order to be able to determine a channel mode, however, it would be necessary for the acquisition means to acquire beforehand channel mode from the chat client.

A ninth aspect of the present invention provides a communication assistance device further comprising second storage means correlating the time of the latest message within the network with the network and storing this correlated information. The first storage means of this communication assistance device stores as a condition, that a length of time has elapsed since the latest message was sent into the network to which the transmission object is to be sent. The determination means determines whether the transmission object meets the condition, based on the time of the latest message in the network to which the transmission object is to be sent.

An example of a stored condition is "At least 15 minutes have elapsed since the latest message." In such a case, the acquisition means must acquire and store message time for each channel each time a message is sent into a channel.

When a condition is met, the execution means outputs a confirmation message, such as, "At least 15 minutes have elapsed since the previous message." The execution means then, depending on the response of the user to the notice, either transmits the message into the chat client or cancels such transmission.

A tenth aspect of the present invention provides a communication assistance device wherein, stored as a condition in the first storage means is, that when a communications address is included in the message, the network to which the transmission object is to be sent and the communications address belong to different computer networks. In this communication assistance device, the determination means determines whether the transmission object meets the condition based on the domain name of the communication device and the domain name of the information terminal providing the network to which the transmission object is to be sent.

An example of a stored condition is, "Sending the URL of the internal network to a chat server outside the company." In such a case, the determination means acquires through the acquisition means the domain name of the user terminal and the domain name of the chat server, and compares the two to determine whether the condition is met or not.

In the event that the condition is met, the execution means outputs a confirmation message such as, "You are trying to send an internal URL to an outside party." Then, depending on the response of the user to the notice, the execution means either transmits the message into the chat client, or cancels such transmission.

An eleventh aspect of the present invention provides a communication assistance device further comprising second storage means storing correlation tables containing the degree of relevance between words. In this communication assistance device, stored as a condition in the first storage means is, that the message does not match the atmosphere of the network to which the transmission object is to be sent. The determination means seeks the degree of relevance between earlier communication content and the content of the transmission object based on the correlation tables, and determines whether the transmission object meets the condition by comparing the sought degree of correlation and a reference value.

An example of a stored condition is, "Degree of relevance with previous messages does not meet a prescribed standard." In order to compute degree of relevance with previous messages, for example, a correlation table must have been created beforehand in which is registered the degree of relevance between words. It is preferable that a correlation table be created for each topic. When a correlation table is created for each topic, channel topic is acquired through the acquisition means.

The determination means computes the degree of relevance between previous messages and an inputted message based on topic and a correlation table. The execution means outputs a confirmation message such as, "This message does not fit in with the atmosphere." Then, the execution means, depending on the response of the user to the notice, either transmits the message into the chat client, or cancels such transmission.

In a communication assistance device according to a twelfth aspect of the present invention, stored as a condition in the first storage means is, that the usage rate of a specified language in previous communications is within a certain range. In such a case, the determination means determines the usage rate of the language based on identifiers marking the beginning and end of a specified language.

Examples of a stored condition are, "The rate of messages in Japanese is below 50%" and "The rate of messages in English is above 50%." In such a case, however, message and destination channel must be acquired beforehand by the acquisition means.

The determination means, by referring to flags indicating, for example, the start and finish of Japanese, can identify whether a message is in Japanese or not. The execution means, when this condition is met, translates the message from, for example, Japanese into English, and transmits into the chat client message including both Japanese and English.

A standard language identifying application can be used to specify the languages being used in messages.

In a communication assistance device according to a thirteenth aspect of the present invention, stored as a condition in the first storage means is, that the transmission object contains a word that another user has made a keyword in the network to which the transmission object is to be sent. The determination means creates beforehand a list of the keywords based on the acquired network information, and based on the keyword list, determines whether or not the keywords are included in the transmission object content.

An example of a stored condition is, "This message contains a keyword." In such a case, keywords have been registered in the first storage means or the like using means of some sort. For example, the determination means stores as a keyword list in the first storage means the nicknames and real names of other users in the channel, acquired by the acquisition means.

When it is determined that the condition is met, the acquisition means, for example, inserts a space into an appropriate position in the keyword contained in the message. With regards to how a keyword is converted, no particular limitations are imposed, provided that a chat client of other user terminal that received the message cannot detect the keyword. After the conversion, the execution means sends into the chat client the message including the converted word.

It is possible for users to inform each other of the keywords they have registered.

In a communication assistance device according to a fourteenth aspect of the present invention, stored as a condition in the first storage means is, that the transmission content is not in a format. The Determination means determines whether the transmission content is written in a format or not based on the transmission content acquired from the acquisition means.

An example of a stored condition is, "The message is at least 30 lines." In such a case, message and name of destination channel are acquired beforehand through the acquisition means. The determination means counts the number of lines in the message, and makes its determination.

If it is determined that the condition is met, the execution means transmits the message into, for example, a communications address set beforehand, and creates a web page. Then it sends the URL for that web page as message into the chat client.

In a communication assistance device according to a fifteenth aspect of the present invention, stored as a condition in the first storage means is, that any portion of a previous message has been selected. If the transmission object meets the condition, information indicating that it is a response to the selected communication content is attached to the transmission content.

For example, let us consider a case where a message is inputted under situation that a previous message by user A has been selected. The execution means adds a symbol such as ">user A" to the end of the message inputted by the user. Alternatively, if a word in a previous message has been selected, e.g., "airplane," ">airplane" is attached to the message.

A sixteenth aspect of the present invention presents a computer-readable recording medium on which is recorded a communication assistance program used in a communication device capable of simultaneously carrying out two-way communication among a plurality of users sharing the same network. The program executes the steps of:

A: correlating conditions relating to the transmission object to be sent to any network with processings for the transmission object and storing the conditions and the processings;

B: acquiring from the communication device information relating to the network in accordance with the conditions and the processings;

C: prior to transmission of the transmission object to the network, determining based on the acquired network information whether the transmission object meets at least one of the conditions;

D: conducting at least one of the processings on the transmission object based on the determination results, and sending the processed transmission object via the communication device to the network.

This has the same effect as the second aspect of the present invention.

From the following detailed description in conjunction with the accompanying drawings, the foregoing and other objects, features, aspects and advantages of the present invention will become readily apparent to those skilled in the art.

BRIEF DESCRIPTION OF THE DRAWINGS

FIG. 2 is an explanatory diagram showing one example of chat information stored in a chat database of FIG. 1;

FIG. 3 is an explanatory diagram showing a concept of a classification list stored in a user database of FIG. 1;

FIG. 4 is a conceptual drawing for explaining an attribute list stored in a user database of FIG. 1;

FIG. 5 is an explanatory diagram showing one example of conditions and processing stored in a condition database of FIG. 1;

FIG. 6 is an explanatory diagram showing one example of a confirmation window displayed by an execution unit;

FIG. 10 is an explanatory diagram showing one example of a display showing which message a message is in response to;

DETAILED DESCRIPTION OF THE PREFERRED EMBODIMENTS

Best Mode for Implementing the Invention

An explanation will be given in detail of the communication assistance device according to the present invention, with reference to embodiments.

First Embodiment

Overall Configuration

Figure 1:
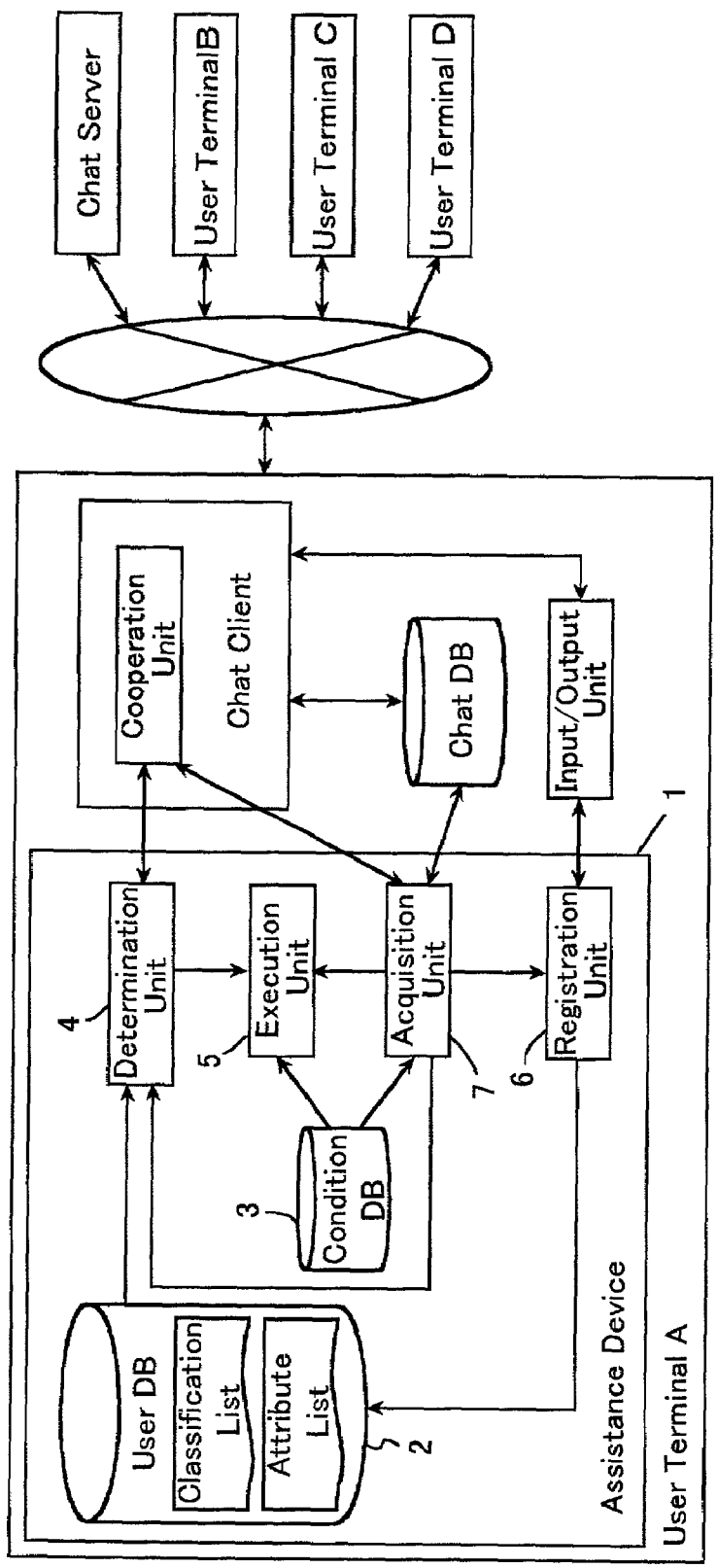
FIG. 1 is a block diagram showing the configuration and function of an assistance device relating to a first embodiment.

FIG. 1 is a block diagram showing the functions of an assistance device 1 relating to the first embodiment. FIG. 1 shows that a plurality of user terminals A, B, C and D interconnected over a computer network are capable of chat via a chat server. On user terminal A, the assistance device 1 and a chat client are operable. On other user terminals B, C and D, the assistance device 1 may or may not be operable, but the chat client at least has to be operable.

The assistance device 1 has a user DB 2 (database), a condition DB 3, a determination unit 4, an execution unit 5, a registration unit 6 and an acquisition unit 7, and it operates together with a chat client. The chat client has a cooperation unit and chat DB. The assistance device 1 can access the chat DB and acquire information.

Chat Client

The chat client displays messages of other users on the input/output unit of user terminal A, and it displays the message inputted from the input/output unit and sends it to a chat server.

The cooperation unit of the chat client, prior to the transmission of the message inputted by a user into a channel, sends the recipient channel name and message into the assistance device 1. The cooperation unit also receives from the assistance device 1 messages processed according to prescribed conditions. Messages accepted by the cooperation unit are sent to a chat server in the same way as an ordinary message inputted by a user, and is displayed on the screens of other users in the channel. The cooperation unit further notifies the assistance device 1 that a message has been sent into any of the channels in which the chat client is participating.

The chat DB stores prescribed chat information that the chat client acquires from a chat server. FIG. 2 shows an example of chat information stored in the chat DB. Chat information includes information about which notice is automatically sent from a chat server upon participation in a channel. Other information stored in the chat database includes information needed for determining whether prescribed conditions are met and for processing in accordance with conditions. Prescribed conditions and processing will be discussed later.

For example, notice of the host name of a chat server is sent when a chat client connects with a chat server. Automatic notification is also made by a server of participants' nicknames, topics, etc., when a user participates in a channel, and when there is a change, notification is also made of the new information.

Meanwhile, the real names of other participants is chat information sent from a chat server in response to a request from a chat client. Other chat information sent in response to a request includes, for example, the names of other channels that other participants are participating in. In FIG. 2, chat information other than information relating to a chat server is stored for each channel.

Other information that a chat client can request of a chat server includes whether a robot or not, whether a one-on-chat or not, etc. What chat information is requested depends on conditions and processing set in the condition DB 3. Instructions for requesting chat information are made by the assistance device 1 by means of the cooperation unit.

Assistance Device (1) Overall Configuration

The determination unit 4 accepts from the cooperation unit recipient channel name and message, and determines whether a message meets a prescribed condition. Conditions that are a basis for determination are stored in the condition DB 3. Conditions will be discussed in detail below. The determination unit 4 also notifies the execution unit 5 of the recipient channel name, message, and the met conditions when it has determined that a message meets a prescribed condition.

When the execution unit 5 receives from the determination unit 4 the recipient channel name, message, and met condition, it carries out processing in accordance with this condition, and sends channel name and message into the cooperation unit. Processing is corresponded with conditions and stored in the condition DB 3. Processing to be executed will be discussed in detail below. If none of the conditions is met, the recipient channel name and message are sent into the cooperation unit.

The registration unit 6 outputs a window, accepts input of prescribed user information, and stores the inputted user information in the user DB 2. User information to be registered is modified in accordance with conditions and processing stored in the condition DB 3, and no particular limits are placed thereupon. User information will be discussed in detail below.

The acquisition unit 7 accesses the condition DB 3 and instructs the cooperation unit to acquire chat information needed for the conditions and processing set in the condition DB 3. The acquisition unit 7 also accesses the chat DB and acquires chat information needed for determining whether the conditions have been met and for processing. The acquisition unit 7 also acquires message time using a time data acquisition program routine when the cooperation unit gives notice that there has been a new message. The acquired time is then written into the chat DB as the time of the most recent message in that channel. A time data acquisition program routine uses the internal clock of a user terminal, and is usually offered by the operating system operating on a user terminal.

(2) User Database

The user DB 2 stores prescribed user information relating to a user. As described above, user information to be stored is changed by conditions for which determination is to be made and by processing carried out in accordance with such conditions, and no particular restrictions are placed thereupon. In the example of FIG. 1, the user DB 2 stores a classification list and an attribute list.

FIG. 3 is a conceptual representation of a classification list. Registered on the classification list for each prescribed classification are, at least, the nicknames of other users than the user himself/herself. Examples of classification standards include "known people," "people to ignore," and "superiors." Because in a chat system, a nickname will be unique throughout a network, the classification list must include nicknames. However, the system may be configured so that other information, such as real names, are registered with the nicknames. Registration on the classification list is performed by a user by means of the registration unit 6.

FIG. 4 is a conceptual representation of an attribute list. On an attribute list, the attribute of either "read only" or "read/write" is set for each channel in which a user is participating. "Read/write" indicates that a user can send messages into a channel he/she is participating in. "Read only" indicates that a user cannot send a message into a channel, and can only look at the message within that channel.

No particular limitations are placed on the method of setting attributes for channels in which a user is participating. For example, the registration unit 6 receives a list of channels being participated in by means of the acquisition unit 7. Next, if there is a channel into which a message can be sent, the registration unit 6 makes the attribute of that channel "read/write," and makes the attributes of the other channels "read only." In such a case, too, it would be preferable for the registration unit 6 to be able to display a window and accept input from a user. This is to allow a user to change attributes automatically set by the registration unit 6.

(3) Condition DB

FIG. 5 shows an example of conditions to be stored in the condition DB 3 and the processing for each condition. A variety of settings for conditions and processing can be made, depending on need. Determination of whether or not a message meets a condition is carried out by the determination unit 4. Processing in accordance with a condition is carried out by the execution unit 5. Below are examples of conditions that are set beforehand, and the corresponding processing.

Condition 1: The number of unknown people in the channel is five or more.

For this condition, the determination unit 4 makes its determination based on the users registered as "known people" on the classification list in the user DB 2 and on the participants in the chat DB. If the condition is met, the execution unit 5 displays a confirmation window, as shown in FIG. 6. The database also outputs onto the confirmation window a message corresponding to the met condition. For example, it can display the message, "There are five or more unknown participants." When the "OK" button in the confirmation window is clicked, the execution unit 5 sends the message into the cooperation unit. When the "cancel" button is clicked, the transmission of message is cancelled.

Condition 2: A superior is participating in the channel.

For this condition, the determination unit 4 makes its determination based on the users registered as "superiors" on the classification list and on the participants in the chat DB. If the condition is met, the execution unit 5 displays a confirmation window, in the same manner as above, and performs processing in accordance with the button that was clicked on. However, the message outputted to the confirmation window will differ depending on the condition. In this case, for example, the message, "A superior is participating in the channel" could be displayed.

Condition 3: The channel attribute is "read only." For this condition, the determination unit 4 makes its determination based on the attribute list within the user DB 2 and the recipient channel name acquired from the cooperation unit. If the condition is met, the execution unit 5 displays the confirmation window with a message as, for example, "The setting for this channel is read only". Then the execution unit 5, when the "OK" button in the confirmation window is clicked, sends the message into the cooperation unit. If the "cancel" button is clicked, the execution unit 5 cancels the transmission of the message.

Condition 4: At least 15 minutes have elapsed since the previous message in the channel.

For this condition, the determination unit 4 makes its determination by comparing the most recent message time written in the chat DB and the current time. If the condition is met, the execution unit 5 displays the confirmation window with a message as, for example, "15 minutes have elapsed since the previous message". Then the execution unit 5, when the "OK" button in the confirmation window is clicked, sends the message into the cooperation unit. If the "cancel" button is clicked, the execution unit 5 cancels the transmission of the message.

Condition 5: Messages in languages other than Japanese make up more than 50% of the messages being sent.

For this condition, the determination unit 4 deems a message to be in Japanese when a message contains a Japanese character code. For example, if a message begins with "0×1B$B" which shows that Japanese is beginning and ends with "0×1B(B" which shows that Japanese is ending, that message will be considered to be Japanese. The determination unit 4 considers any other messages to be in languages other than Japanese. Specification of a use language using a commonly used language determination application makes it possible to determine whether a message is in Japanese or not. When analyzing languages being used, it is preferable to use processing that does not subject to analysis words commonly used in conversation expressed in foreign characters. For example, words like "WWW," "URL," "PGP" and such that are commonly used in a number of languages should be registered beforehand and excluded from analysis.

If the condition is met, the execution unit 5 activates a normally used translation application and translates that message into a prescribed language. The translated message and the original message are sent together as one message into the cooperation unit.

Condition 6: This message contains a likely keyword.

Figures 7, 8:
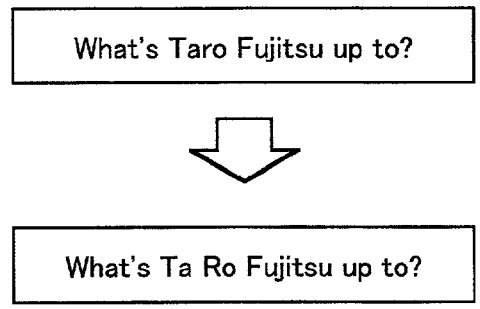
FIG. 7 is an explanatory diagram showing one example of a keyword list created in a condition database of FIG. 1.
FIG. 8 is an explanatory diagram showing one example of a conversion of a keyword by an execution unit.

For this condition, the determination unit 4 creates a keyword list beforehand in the condition DB 3, and makes its determination based on the created keyword list. FIG. 7 is a conceptual representation of a keyword list. Usually, when a user sets a keyword in a chat client, he or she will often register his or her nickname or real name. Thus the determination unit 4 registers on a keyword list as likely keywords the nicknames and names of the users sharing the channel in which the chat client is participating. The acquisition unit 7 acquires these nicknames and names from the chat DB and transmits them into the determination unit 4.

When there is a change in the users composing a channel, the acquisition unit 7 notifies the determination unit 4 and the keyword list is updated.

The determination unit 4 makes its determination whether a keyword is included in a message based on the keyword list for a channel on which there was a message. If a keyword is included in a message, the determination unit 4 notifies the execution unit 5 of the included keyword. The execution unit 5 performs a conversion, such as inserting a space into the keyword, and sends the message containing the converted keyword to the cooperation unit. FIG. 8 shows an example of a keyword converted by the execution unit 5. A space has been added to the keyword "Taro Fujitsu," converting it to "Ta Ro Fujitsu."

Condition 7: The inputted content is 30 lines long or more.

For this condition, the determination unit 4 calculates the number of lines of the message acquired from the cooperation unit. If the condition is met, the execution unit 5 sends the message into a communication address established in advance, and creates a web page containing the message. As the communication address, a directory or the like within an information terminal capable of communicating with user terminals is established on the computer network. Standard methods of transmission and web page creation are used. The execution unit 5 sends the URL of the communication address to the cooperation unit after the web page is created.

Condition 8: A message containing an internal URL is being sent into a server outside the company.

For this condition, the determination unit 4 first determines whether or not an URL is included in a message. If an URL is included in a message, the determination unit 4 acquires the host name of the user terminal from the chat client and obtains the domain name. The determination unit 4 then acquires from the chat DB by means of the acquisition unit 7 the host name of the chat server to which the chat client is connected, and obtains the domain name thereof. The determination unit 4 compares the extracted user terminal domain name and chat server domain name, and if they are different determines that the chat server is a server outside the company.

If the condition is met, the execution unit 5 displays a message such as, "This message contains an internal URL" as well as a confirmation window shown in FIG. 6. If the "OK" button in the confirmation window is clicked, the execution unit 5 transmits the message into the cooperation unit. If the "cancel" button is clicked, it cancels transmission of the message.

Condition 9: This message does not match the atmosphere in the channel.

Figure 9:
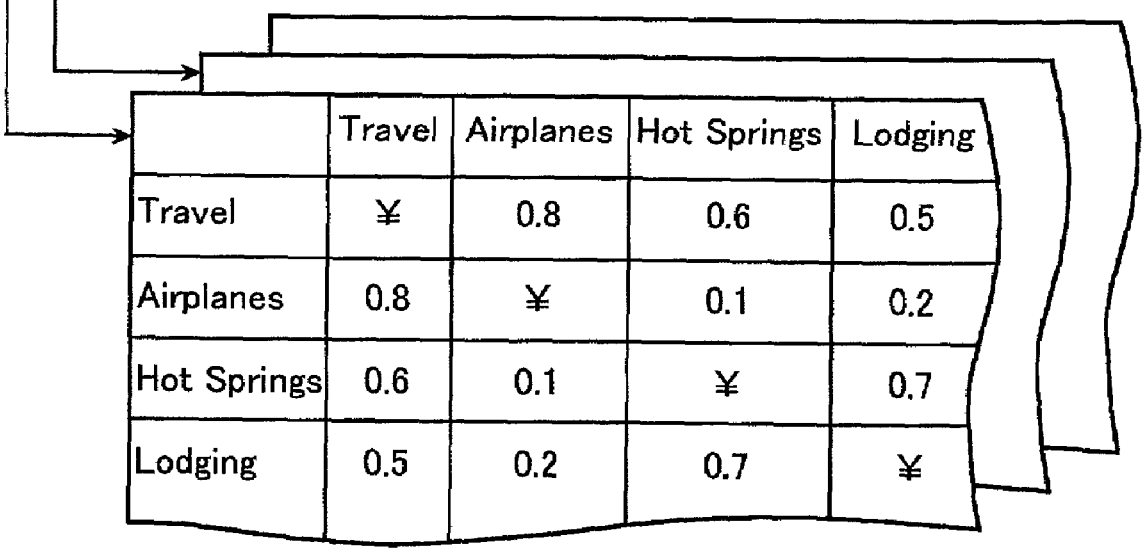
FIG. 9 is an explanatory diagram showing one example of a correlation table created beforehand in a condition database.

For this condition, the determination unit 4 makes its determination based on a correlation table prepared in advance in the condition DB 3 and topics acquired from a chat DB. FIG. 9 shows an example of correlation tables which are connected with topic groups and stored. In FIG. 9, topics that are anticipated and seem to be related to each other are grouped together in advance in the same topic group.

Correlation tables are prepared by connecting them with topics. This is because if the topic is different, the same keyword will have a different degree of relevance. One topic may also be associated with a single correlation table. Also, as shown in FIG. 9, a topic group containing a plurality of topics may be associated with a single correlation table. On a correlation table, keywords that would seem to have relevance to a certain topic or topic group are registered along with the degree of relevance between the keywords themselves. The determination unit 4 decides which correlation table is to be used based on the channel topic. Then the determination unit 4 computes the degree of relevance of the message to that topic.

An explanation will be given of an example of a method for seeking the degree of relevance based on the correlation tables shown in FIG. 9. Let us suppose that keywords such as "travel," "airplane," and "hot springs" have been appearing in past messages, and that a message including the keyword "lodging" has been inputted. The degree of relevance of the keyword "lodging" with the previous messages is computed as follows: $(0.5+0.2+0.7)/3=0.47$. The determination unit 4 compares the degree of relevance thus computed with a previously established reference value to determine whether the message matches the atmosphere in the channel. If the computed degree of relevance is less than the reference value, the execution unit 5 displays a message such as, "The message may not match the atmosphere in the channel" as well as the confirmation window shown in FIG. 6.

Condition 10: The message to which this message is a response should be indicated.

For this condition, when the message is inputted, the determination unit 4 determines whether or not a previous message or any portion of a previous message has been selected. FIG. 10 shows an example of a message in which is shown the message that is being responded to. When this condition is met, the execution unit 5 adds to the end of the inputted message, following the prompt sign, the nickname of the user that sent the selected message or the selected portion. A message to which a prompt sign and nickname have been added is sent by the execution unit 5 to the cooperation unit, and is sent to a server in the same manner as a standard message.

Assistance Processing Flow (1) Assistance Processing

Figure 11:
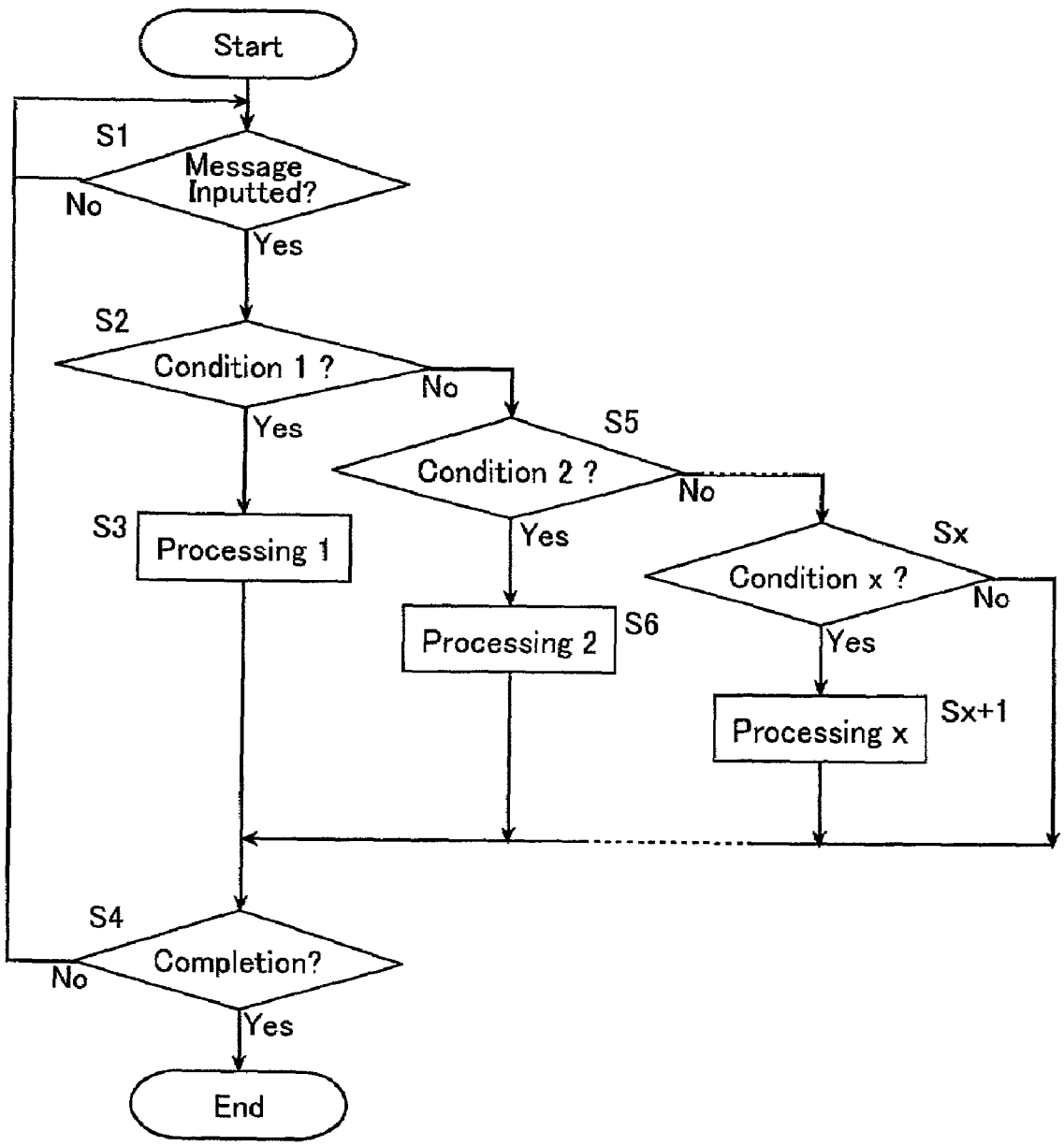
FIG. 11 is a flowchart showing the flow of message assistance processing carried out by an assistance device relating to the first embodiment.

FIG. 11 is a flowchart showing the basic flow of assistance processing performed by the assistance device 1 relating to this embodiment. Processing begins when a chat client participates in any channel.

First, in Step S1, the cooperation unit of the chat client awaits input of message. When message is inputted by a user and the return key is pressed, the cooperation unit sends the inputted content and channel name to the determination unit 4.

In Step S2, the determination unit 4 determines whether condition 1 is met. If it is met, Step S3 ensues; if it is not met Step S4 ensues.

In Step S3, the execution unit 5 carries out processing corresponding to the condition 1.

In Step S4, the determination unit 4 determines whether the chat client is participating in any channel. If it is participating in a channel, Step S1 ensues and awaits a message. If it is not participating in a channel, this processing ends.

In Steps S5 through S(x+1), the determination unit 4 determines in succession whether conditions 2 through x are met. If a condition is met, the execution unit 5 carries out processing corresponding to the met condition, and Step S4 ensues.

In the above-described processing, determination is made in succession whether conditions 1 through x are met. When one of the conditions is met, determination is not made regarding the remaining conditions, and processing corresponding to the met condition is carried out. Therefore, it is preferable to establish a priority order for conditions, so that determination is carried out in order, starting with the most important conditions. It is also possible to process in such a manner that determination is made whether a plurality of conditions are met and when a plurality of conditions are met, processing corresponding to all met conditions is carried out.

(2) Specific Example of Assistance Processing

Figure 12:
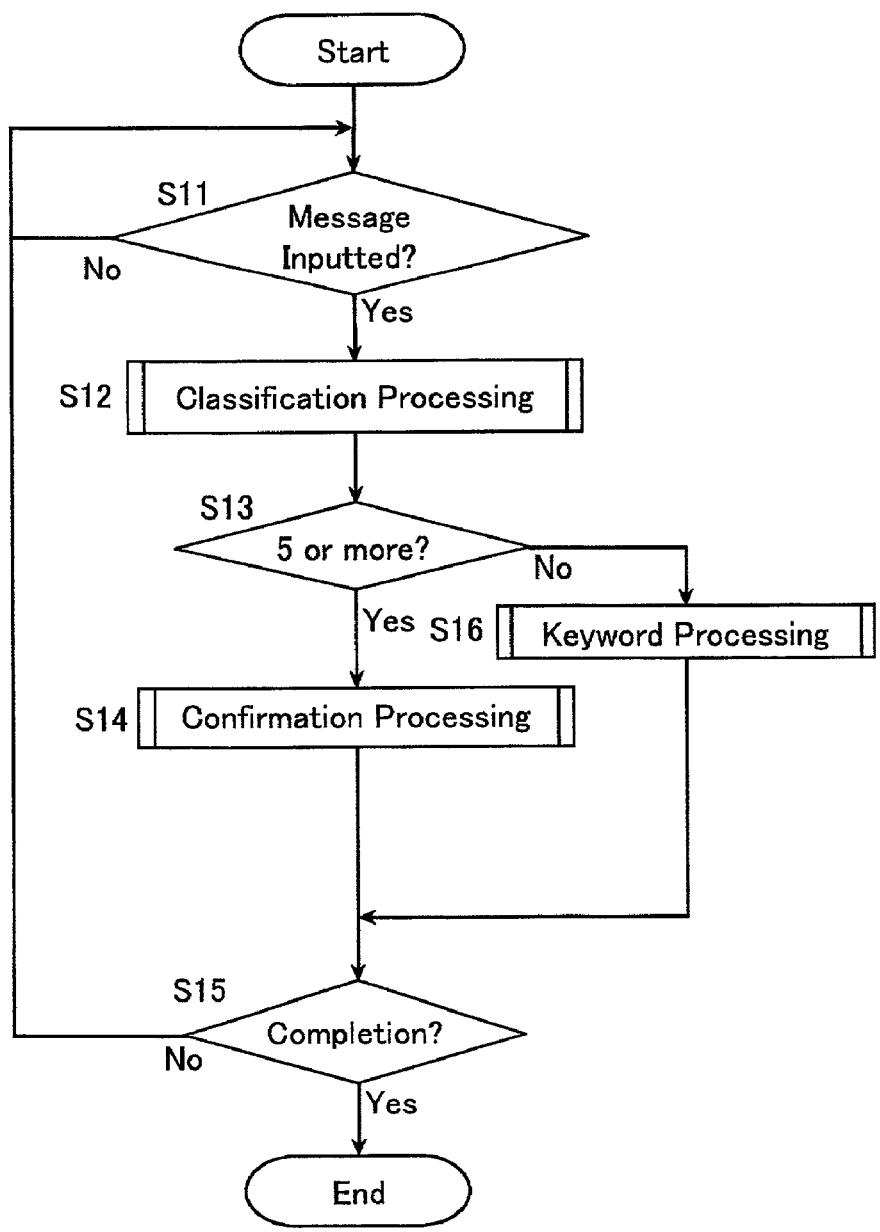
FIG. 12 is a flowchart showing a specific flow of message assistance processing carried out by an assistance device relating to the first embodiment.

Next, using as an example a case where determination is made about two conditions, a specific explanation will be made. FIG. 12 is a flowchart showing a specific example of the assistance processing shown in FIG. 11. Two examples of conditions set in the condition DB 3 will be looked at, "There are five or more unknown people in the channel" (Condition 1 above) and "This is a message containing a likely keyword" (Condition 6 above). When a chat client participates in any channel, the following process commences.

First, in Step S11, the cooperation unit of the chat client awaits the input of message. When message is inputted by a user and the return key is pressed, the cooperation unit sends the inputted message and channel name to the determination unit 4.

In Step S12, the classification processing sub-routine, explained below, is executed; that is, the determination unit 4 computes how many unknown people are in the channel into which the message was inputted.

In Step S13, the determination unit 4 determines whether five or more unknown people are in the channel. If there are five or more unknown people, Step S14 ensues. If there are fewer than five unknown people, control proceeds to Step S15.

In Step S14, the confirmation processing sub-routine, explained below, is executed; that is, the execution unit 5 notifies the user that there are five or more unknown people, and confirms with the user whether or not to send the message as-is.

In Step S15, the determination unit 4 determines whether the chat client is participating in any channel. If it is participating, Step S11 ensues, and a message is awaited.

When in Step S13 the determination unit 4 determines that there are fewer than five unknown people, Step S16 ensues. In Step S16, the keyword processing sub-routine, explained below, is executed; that is, the determination unit 4 determines whether a keyword that another user is likely to have registered is included in the message, and processing in line with the determination is performed. Then Step S15 ensues, and the processing of Step S15 is performed.

(3) Classification Processing Sub-Routine

Figure 13:
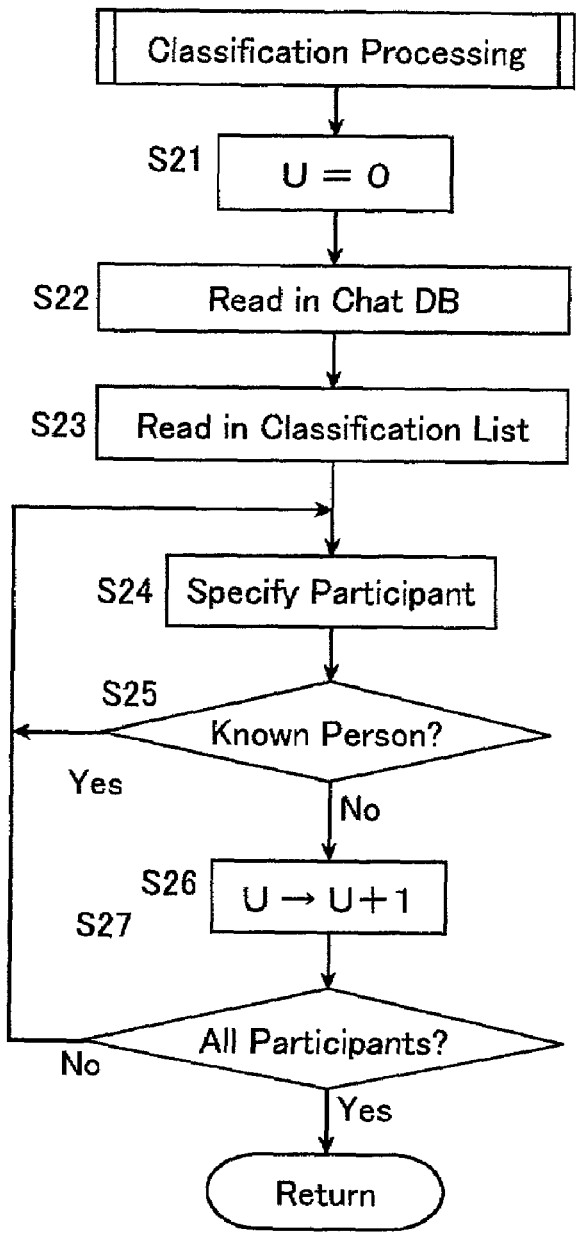
FIG. 13 is a flowchart showing one example of classification processing in the processing of FIG. 12.

FIG. 13 is a flowchart showing the flow of classification processing carried out by the determination unit 4. When Step S12 ensues in the flowchart shown in FIG. 12 the below processing is performed.

First, in Step S21, the determination unit 4 initializes the number of unknown people "u".

In Step S22, the determination unit 4 reads from the chat DB the nicknames of users participating in the channel of which notification was sent by the cooperation unit.

In Step S23, the determination unit 4 reads a "known people" list from the user classification list of the user DB 2.

In Step S24, the determination unit 4 specifies the first participant in the channel as a subject of determination.

In Step S25, determination is made of whether the user specified in Step S24 is included on the "known people" list. If the user is included, Step S24 ensues, and makes the next user a subject of determination. If the first user is not included in the list, Step S26 ensues.

In Step S26, the number of unknown people "u" is incremented ("u"→"u+1").

In Step S27, determination is made as to whether determination of known or unknown person has been made for all the users participating in the channel. If determination has not been completed for all, Step S24 ensues, and repeats determination for the next users. When determination for all the users is completed, control returns to the main routine of FIG. 12.

(4) Confirmation Processing Sub-Routine

Figure 14:
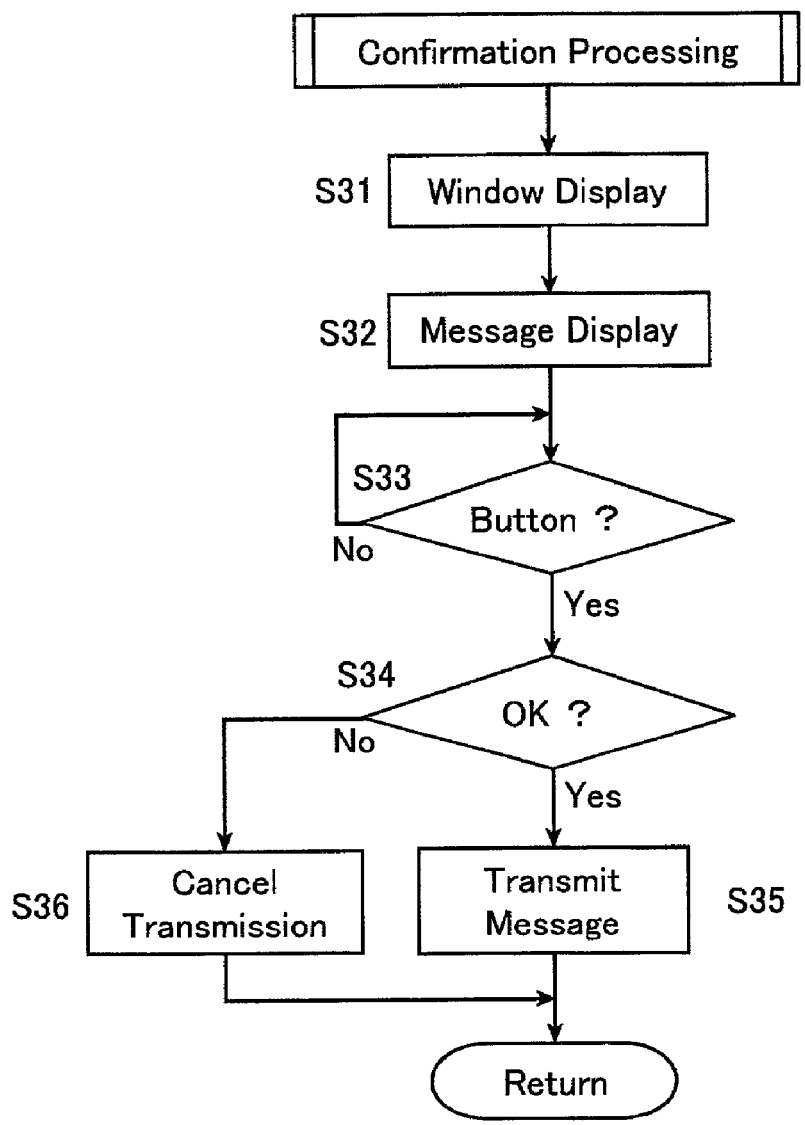
FIG. 14 is a flowchart showing one example of confirmation processing in the processing of FIG. 12.

FIG. 14 is a flowchart showing the flow of confirmation processing carried out by the determination unit 4. When it is determined in the flowchart shown in FIG. 12 that there are five or more unknown people, the following processing is performed.

First, in Step S31, the execution unit 5 displays the confirmation window of FIG. 6.

In Step S32, the execution unit 5 displays a message on the confirmation window in accordance with the condition. In this example, the execution unit 5 displays the message "There are five or more unknown people participating."

In Step S33, the execution unit 5 waits for either the "OK" button or the "cancel" button of the confirmation window to be clicked on. The execution unit 5, while waiting for either of the buttons to be clicked on, accepts editing of the inputted content in the confirmation window. When either of the buttons is clicked on, Step S34 ensues.

In Step S34, the execution unit 5 determines whether the "OK" button has been clicked on. If it has been clicked, Step S35 ensues. If the cancel button has been clicked on, Step S36 ensues.

In Step S35, the execution unit 5 transmits the inputted message into the cooperation unit and closes the confirmation window. The cooperation unit transmits the received message into a server in the same manner as message inputted in the standard manner.

In Step S36, the execution unit 5 cancels the transmission of the inputted message into the cooperation unit and closes the confirmation window.

(5) Keyword Processing Sub-Routine

Figure 15:
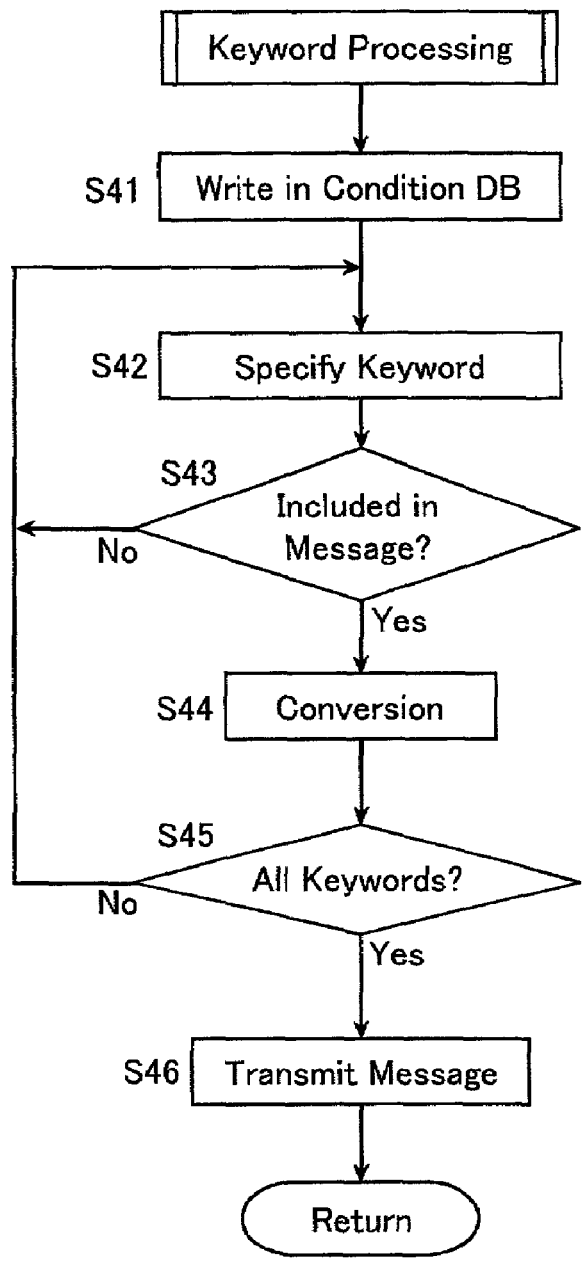
FIG. 15 is a flowchart showing one example of keyword processing in the processing of FIG. 12.

FIG. 15 is a flowchart showing the flow of keyword processing carried out by the determination unit 4 and the execution unit 5. When S16 ensues in the flowchart of FIG. 12, the following processing is carried out.

First, in Step S41, the determination unit 4 reads from the condition database 3 the list of likely keywords in the channel into which the message has been inputted. Let us suppose here that a message has been inputted for channel no. #CH1.

In Step S42, the determination unit 4 specifies the first keyword from among the read keywords as the keyword subject to determination. If the example of a keyword list shown in FIG. 7 is used, user-B is first specified.

In Step S43, the determination unit 4 determines whether the specified keyword is included in the message. If the keyword is included, the determination unit 4 notifies the execution unit 5 of the included keyword, and Step S44 ensues. If the keyword is not included, Step S42 ensues, and the next likely keyword is made the subject of determination.

In Step S44, the execution unit 5 inserts a space into a keyword of which it has received notification, and replaces the keyword in the message with the keyword with a space inserted.

In Step S45, it is determined whether determination has been made for all the read keywords of whether they are included in the message. If such determination has not yet been completed, Step S42 ensues, and the determination is repeated. If determination has been made for all the likely keywords, Step S46 ensues.

In Step S46, the execution unit 5 transmits message into the cooperation unit. Keywords included in the message to be sent have a space inserted therein. If no keywords are included in the message, the inputted content is transmitted as-is into the cooperation unit. Then the main routine of FIG. 12 ensues.

Other Embodiments (a) In the first embodiment, a keyword list is created by the determination unit 4 in order to determine whether or not a keyword is included. Other configurations are possible. For example, users could exchange among themselves the keywords that they themselves have registered, thereby making a keyword list. More specifically, keywords are acquired in succession from users sharing the channel in which the chat client is participating, and the acquired keywords are registered on a keyword list. When any user has left the channel, the keywords of that user are deleted from the keyword list.

(b) In the first embodiment, of the information necessary for determination of conditions and processing set in the condition DB 3, information not set in the chat system is given to the user DB 2 and the condition DB 3. However, such necessary information may be set on the chat system, and all determination of conditions and processing may be carried out based on chat information within the chat database.

(c) In the first embodiment, the various conditions subject to determination and the processing in response to such conditions can be set as desired. Furthermore, normally used external applications supporting character input can be used to assist in sending messages. For example, spell check, correction of Japanese character conversion errors, correction of typos, grammar checks, punctuation mark conversion, manipulation of parentheses and other external applications are activated upon message input. In addition, these applications could be activated when inputted contents in the confirmation window are edited.

INDUSTRIAL APPLICABILITY

As described above, use of the present invention can help send messages of users conversing over a computer network more accurate, leading to smoother conversation among users and promotion of communication over computer networks.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A communication assistance method performed by a communication assistance device used in a communication device capable of simultaneously carrying out two-way communication among a plurality of users sharing the same channel, said communication assistance device and said communication device residing in a user terminal, said method including:

correlating conditions relating to a transmission object with processings for said transmission object or correlating conditions relating to a channel with processings for a transmission object sent to said channel, said transmission object representing a chatroom message to be transmitted and said processings representing operations to be performed based on calculations or analysis relating to said transmission object or to said channel;

acquiring from said communication device information relating to said channel in accordance with said conditions and said processings;

prior to transmission of said transmission object to said channel, determining based on said acquired channel information whether said transmission object meets at least one of said conditions; and conducting at least one of said processings on said transmission object based on said determination results, and sending said processed transmission object via said communication device to said channel.

2. A communication assistance device used in a communication device capable of simultaneously carrying out two-way communication among a plurality of users sharing the same channel, said communication assistance device and said communication device residing in a user terminal, comprising:

first storage means wherein conditions relating to a transmission object are correlated with processings for said transmission object, and then stored, said transmission object representing a chatroom message to be transmitted and said processings representing operations to be performed based on calculations or analysis relating to said transmission object or to said channel;

acquisition means acquiring said channel-related information from said communication device in accordance with said conditions and processings;

determination means determining, based on said acquired channel information, whether at least one of said conditions is met with regard to said transmission object prior to the sending thereof to said channel; and execution means carrying out at least one of said processings on said transmission object based on said determination results, and sending said processed transmission object to said channel by means of said communication device.

3. A communication assistance device according to claim 2, further comprising second storage means storing user-dependent user information which corresponds to said conditions and processings, and registration means accepting input of said user information from a user, and storing the same in said second storage means.

4. A communication assistance device according to claim 2, further comprising second storage means storing user-dependent user information which corresponds to said conditions and processings, and registration means setting said user information based on said channel information, and storing the same in said second storage means.

5. A communication assistance device according to claim 2, wherein channel information that said acquisition means acquires from said communication device includes at least information specifying the channel to which said transmission object is to be sent and transmission content.

6. A communication assistance device according to claim 2, wherein channel information that said acquisition means acquires from said communication device includes at least information specifying the channel to which said transmission object is to be sent and transmission content, and,
when said transmission object meets said condition, said execution means notifies a user of said met condition and transmission content, and depending on the response from the user to said notice, either transmits said transmission object to said channel or cancels such transmission.

7. A communication assistance device according to claim 2, further comprising second storage means storing users classified into classifications, wherein:
said first storage means stores as a condition, that in a channel to which said transmission object is to be sent, the number of users belonging to a classification is within a range; and
said determination means determines, based on classified users in said second storage means, whether or not said transmission object meets said condition.

8. A communication assistance device according to claim 2, further comprising second storage means storing attributes of a channel with which said communication device is communicating, wherein:
said first storage means stores, as a condition, that the channel to which said transmission object is to be sent has an attribute; and
said determination means determines whether said condition is met based on attributes of the channel to which the transmission object is to be sent, said attributes being stored in said second storage means.

9. A communication assistance device according to claim 2, further comprising second storage means correlating the time of the latest message included in said transmission object within said channel with said channel and storing this correlated information;
wherein:
said first storage means stores as a condition, that a length of time has elapsed since the latest message was sent into the channel to which said transmission object is to be sent; and
said determination means determines whether said transmission object meets said condition based on the time of the latest message in said channel to which said transmission object is to be sent.

10. A communication assistance device according to claim 2, wherein, stored as a condition in said first storage means is, that when a communications address is included in said transmission content, said channel to which said transmission object is to be sent and said communications address belong to different computer channels, and
said determination means determines whether said transmission object meets said condition based on the domain name of said communication device and the domain name of the information terminal providing said channel to which said transmission object is to be sent.

11. A communication assistance device according to claim 2, further comprising second storage means storing a correlation table containing degree of relevance between prescribed words, wherein:
stored as a condition in said first storage means is, that the content of transmission object does not match the atmosphere of said channel to which said transmission object is to be sent, and
said determination means seeks degree of relevance between earlier communication content and content of said transmission object based on said correlation table, and determines whether said transmission object meets said condition by comparing said sought degree of correlation and a reference value.

12. A communication assistance device according to claim 2, wherein stored as a condition in said first storage means is, that the usage rate of a language in previous communications is within a certain range, and
said determination means determines the usage rate of said language based on identifiers marking the beginning and end of said language.

13. A communication assistance device according claim 2, wherein stored as a condition in said first storage means is, that said transmission object contains a word that another user has made a keyword in said channel to which said transmission object is to be sent, and
said determination means creates beforehand a list of said keywords based on said acquired channel information, and based on said created keyword list, determines whether or not said keyword is included in said transmission object.

14. A communication assistance device according to claim 2, wherein stored as a condition in said first storage means is, that said transmission object is not in a format, and
said determination means determines whether said transmission object is written in said format or not based on the transmission object acquired from said acquisition means.

15. A communication assistance device according to claim 2, wherein stored as a condition in said first storage means is, that any portion of a communication in previously transmitted object has been selected, and
when said transmission object meets said condition, said execution means adds information indicating that said transmission object is a response to said selected message to said transmission object.

16. A computer-readable recording medium on which is recorded a communication assistance program executed by a communication assistance device used in a communication device capable of simultaneously carrying out two-way communication among a plurality of users sharing the same channel, said communication assistance device and said communication device residing on a user terminal, said program executing:
correlating conditions relating to a transmission object with processings for said transmission object and storing said conditions and processings, said transmission object representing a chatroom message to be transmitted and said processings representing operations to be performed based on calculations or analysis relating to said transmission object or to said channel;
acquiring from said communication device information relating to said channel in accordance with said conditions and processings;
prior to the transmission of said transmission object to said channel, determining based on said acquired channel information whether said transmission object meets at least one of said conditions;
conducting at least one of said processings on said transmission object based on said determination results, and sending said processed transmission object to said channel over said communication device.

17. A communication assistance method according to claim 1, further comprising:

storing user-dependent user information which corresponds to said conditions and processings; and accepting input of said user information from a user and storing said input.

18. A computer-readable recording medium according to claim 16, wherein said program further executes the steps of:

storing user-dependent user information which corresponds to said conditions and processings; and accepting input of said user information from a user and storing said input.

19. A communication assistance method used in a communication device capable of simultaneously carrying out two-way communication among a plurality of users sharing the same network, said method including the steps of:

correlating conditions relating to a transmission object to said any network with the processings for said transmission object related to each condition and/or correlating conditions relating to said any network with the processings for a transmission object sent to said any network, said object representing a chatroom message to be transmitted and said processings representing operations to be performed based on calculations or analysis relating to said object acquiring from said communication device at least an identifier of said network and said transmission object;

prior to transmission of said transmission object to said network, determining whether said transmission object satisfies at least any of said conditions at the timing when said transmission object is acquired; and transmitting said transmission object to the network identified by said acquired identifier via said communication device by conducting a processing corresponding to said satisfied condition or stopping transmission based on said determination result.

* * * * *